(12) United States Patent
Kim (10) Patent No.: US 6,317,318 B1
(45) Date of Patent: Nov. 13, 2001

(54) DISK DRIVE MOUNTING STRUCTURE FOR COMPUTERS AND METHOD FOR MOUNTING A DISK DRIVE TO A COMPUTER CHASSIS

(75) Inventor: Tae-Sang Kim, Suwon (KR)

(73) Assignee: SamSung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/570,457

(22) Filed: May 12, 2000

(30) Foreign Application Priority Data

Jun. 7, 1999 (KR) .................................................. 99/21003

(51) Int. Cl.⁷ ...................................................... G06F 1/16
(52) U.S. Cl. .......................... 361/685; 361/740; 361/759; 364/708.1; 248/635
(58) Field of Search ...................................... 361/685–686, 361/732, 740, 754, 759, 801, 825, 725, 727; 360/97.01, 137; 364/708.1; 248/60, 581, 609, 611, 615, 634, 635, 638

(56) References Cited

U.S. PATENT DOCUMENTS

| 5,122,914 | 6/1992 | Hanson | 360/98.01 |
|---|---|---|---|
| 5,224,024 | * 6/1993 | Tu et al. | 364/429 |
| 5,327,308 | 7/1994 | Hanson | 360/97.01 |
| 5,332,306 | 7/1994 | Babb et al. | 312/223.1 |
| 5,572,402 | 11/1996 | Jeong | 361/685 |
| 5,600,538 | * 2/1997 | Xanthopoulos | 361/683 |
| 5,668,696 | 9/1997 | Schmitt | 361/685 |
| 5,673,171 | * 9/1997 | Varghese et al. | 361/685 |
| 5,808,864 | 9/1998 | Jung | 361/685 |
| 6,040,980 | 3/2000 | Johnson | 361/685 |
| 6,050,658 | 4/2000 | O'Sullivan et al. | 312/223.1 |

* cited by examiner

*Primary Examiner*—Leo P. Picard
*Assistant Examiner*—Hung Van Duong
(74) *Attorney, Agent, or Firm*—Robert E. Bushnell, Esq.

(57) ABSTRACT

A disk drive mounting structure and method for mounting a disk drive to a computer chassis is disclosed. The mounting structure has a chassis, first and second brackets and first and second locking members. The chassis has a base surface. The first bracket has a drive-supporting surface and is separably combined with the base surface. The second bracket has two opposing side portions and a top portion connecting the side portions and is combined with the first bracket at its side portions with the top portion being spaced apart from the drive-supporting surface. The first locking member is formed on the drive-supporting surface and is engaged with a first sidewall of the disk drive. The second locking member is formed on one of the side portions of the second bracket and is engaged with a second sidewall of the disk drive.

20 Claims, 12 Drawing Sheets

DISK DRIVE MOUNTING STRUCTURE FOR COMPUTERS AND METHOD FOR MOUNTING A DISK DRIVE TO A COMPUTER CHASSIS

CLAIM OF PRIORITY

This application makes reference to, incorporates the same herein, and claims all benefits accruing under 35 U.S.C. §119 from an application entitled Computer with a Disk Drive Mounting Assembly and Method of Assembling Disk Drive to a Computer Chassis earlier filed in the Korean Industrial Property Office on Jun. 7, 1999, and there duly assigned Ser. No. 99-21003 by that Office.

BACKGROUND OF THE INVENTION

1. Field of the Invention

The present invention relates, in general, to computers and, more particularly, to a disk drive mounting structure for computers and a method for mounting a disk drive to a computer chassis.

2. Description of the Background Art

Generally, every kind of computer has one or more disk drives each of which is a physical unit that holds, spins, reads and writes magnetic disks or CD-ROMs (Compact Disc-Read Only Memory). Each of the disk drives is mounted to the chassis of the computer. Currently, generally used disk drives are floppy disk drives, DVD (Digital Versatile Disc) drives or CD-ROM drives. Each of the disk drives includes a housing combined with the chassis and contains drive elements.

To mount such a disk drive, there have been employed two techniques. One technique is a mounting technique using screws that are respectively and fixedly inserted into the disk drive through mounting holes formed on the side surface of a drive bay. However, according to this conventional technique, since various kinds of disk drives supplied by different manufacturers do not have uniform sizes or uniform allowances, many problems occur. That is, when the disk drive has a size smaller than a size allowed by the chassis, a gap around the disk drive is greater than desired, by that deteriorating the appearance of the computer. In addition, since the drive bays are fixed to the chassis of the computer and the sizes of the drive bays may be different, these cause the gap to be widened further. Furthermore, this technique using a plurality of screws requires excessive time and labor and additional parts.

The other technique is a mounting technique utilizing intermediate brackets and drive rails fixed to the disk drive. According to this technique, the disk drive, to which brackets and drive rails are fixed, is slid into a chassis from the front of the chassis and is fixed by means of snaps or screws. In a case where laterally fixed rails are used, it is difficult to situate the rails at a proper position. In addition, when the brackets or rails are fixed to the side of the disk drive, a mounting gap is generated as described above, thereby causing the disk drive to be moved to the left and to the right. Furthermore, when the disk drive, to which brackets and drive rails are fixed, is fixed to the chassis, there should be provided front and rear allowances sufficient for compensating the mounting gap and the movements of the drive brackets and the drive bays.

In brief, according to the conventional techniques, the mounting and separation of a disk drive is difficult, the supply and control of mounting parts are difficult due to the excessive quantity of the parts, the manufacturing cost is expensive due to the excessive quantity of the parts, and the reliability of the product is deteriorated due to a great mounting gap.

An exemplar of the art, Babb et al. (U.S. Pat. No. 5,332,306, Computer Disk Drive Mounting Apparatus, Jul. 26, 1994) discloses a disk drive mounting arrangement allowing for two adjacent bays. Hanson (U.S. Pat. No. 5,122,914, Disk Drive System with Transportable Carrier and Mounting Assembly, Jun. 16, 1992) and Hanson (U.S. Pat. No. 5,327,308, Disk Drive System with Transportable Carrier and Mounting Assembly, Jul. 5, 1994) disclose an arrangement that provides for quick removal and quick installation of a disk drive unit. Schmitt (U.S. Pat. No. 5,668,696, Carrier-Based Mounting Structure for Computer Peripheral Chassis, Sept. 16, 1997) discloses a structure and technique for removably mounting a chassis within a bay in a computer housing. O'Sullivan et al. (U.S. Pat. No. 6,050,658, Carrier for an Electronic Device, Apr. 18, 2000) shows a computer case design for mounting multiple electronic devices such as disk drives. Johnson (U.S. Pat. No. 6,040,980, Disk Drive to Chassis Mounting Apparatus and Method, Mar. 21, 2000) discloses a mounting structure for disk drives without the use of tools or conventional fasteners. Jung (U.S. Pat. No. 5,808,864, Personal Computer with Disk Drive Mounting Structure, Sep. 15, 1998) discloses a mounting structure for disk drive that minimizes the necessary mounting space. Jeong (U.S. Pat. No. 5,572,402, Hard Disk Drive Mounting Assembly for a Computer, Nov. 5, 1996) discloses a structure allowing for quick insertion of a hard disk drive using slides and rail hooks.

I have found that conventional art does not properly show a structure that allows for easy mounting and separation of a disk drive while reducing the mounting gap between the disk drive and the chassis.

SUMMARY OF THE INVENTION

The present invention is disclosed to solve the aforementioned problems, and accordingly it is an object of the present invention is to provide a disk drive mounting structure for computers, capable of simplifying the mounting process of disk drives to the chassis.

It is another object to provide a disk drive mounting structure for computers, capable of reducing the quantity of parts for mounting a disk drive to the chassis.

It is a further object to provide a disk drive mounting structure for computers, capable of reducing a mounting gap that may occur in the process of mounting the disk drive to the chassis.

It is yet another object to have a storage media drive mounting structure allowing for quick assembly and disassembly.

In order to accomplish the above object, the present invention provides a disk drive mounting structure for computers, with a chassis having a base surface, a first bracket having a drive-supporting surface and being separably combined with the base surface, a second bracket having two opposing side portions and a top portion connecting the side portions and being combined with the first bracket at its side portions with the top portion being spaced apart from the drive-supporting surface, a first locking member being formed on the drive-supporting surface and being engaged with a first sidewall of the disk drive, and a second locking member being formed on one of the side portions of the second bracket and being engaged with a second sidewall of the disk drive.

The disk drive is preferably provided with one or more holes at its side portions, and each of the first and second locking members is inserted into a corresponding one of the holes. The first locking member preferably has a vertical portion and first one or more fingers, the first fingers being extended inwardly from the vertical portion and being inserted into the holes of the disk drive with the sidewall of the disk drive being in contact with the vertical portion. One of the first fingers preferably is horizontal, while the other one of the first fingers is vertical.

The second locking member has one or more tabs formed on a side of the second bracket and second one or more fingers extended inwardly from the tabs, the fingers being inserted into the holes of the disk drive with the tabs being in contact with a sidewall of the disk drive and the sidewall being space apart from a side of the second bracket. One of the second fingers preferably is horizontal, while the other one of the second fingers is vertical. The first bracket forms a portion of the chassis.

The first bracket has a first flange and a fixing hole, the first flange being formed vertically on a side of the first bracket and having a slot, the fixing hole being formed on an opposite side of the first bracket; the second bracket has a second flange and a third flange, the second flange being formed horizontally on a side of the second bracket corresponding to the first flange, the third flange being formed horizontally on an opposite side of the second bracket and having a fixing hole corresponding to the fixing hole of the first bracket; and the second flange of the second bracket is inserted into the slot of the first flange of the first bracket and the third flange of the second bracket is fixed to the first bracket by means of a screw passing through the fixing holes of the first and second brackets.

The first bracket has an additional notch at its side on which the fixing hole is formed, and the second bracket has an additional tab that is inserted into the additional notch. The disk drive has one or more additional holes at its bottom, and the first bracket has one or more additional pins that are inserted into the additional holes. Additionally, the structure preferably has a second disk drive combined with the second bracket.

In addition, the present invention provides a method for mounting a disk drive to a computer chassis, with the steps of combining a first bracket having a drive-supporting surface with a computer chassis, positioning a first disk drive on the drive-supporting surface with a first sidewall of the first disk drive being engaged with a first locking member formed on the drive-supporting surface, engaging a second sidewall of the first disk drive with a second locking member formed on an opposite side of a second bracket to the first locking member and combining the second bracket with the first bracket. The method preferably has the additional step of combining a second disk drive with the second bracket.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE DRAWINGS

Figure 1:
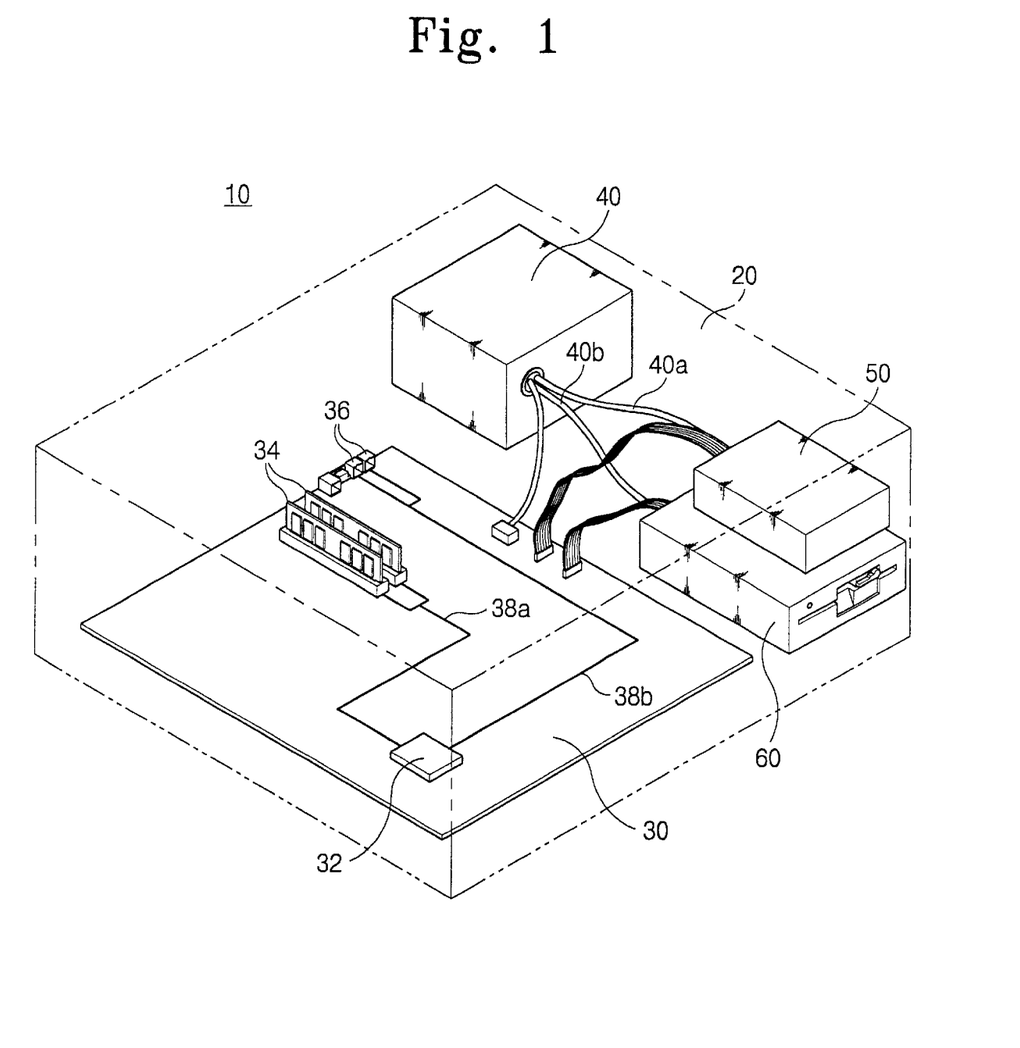
FIG. 1 is a perspective view showing a construction of a personal computer.
Figure 2A:
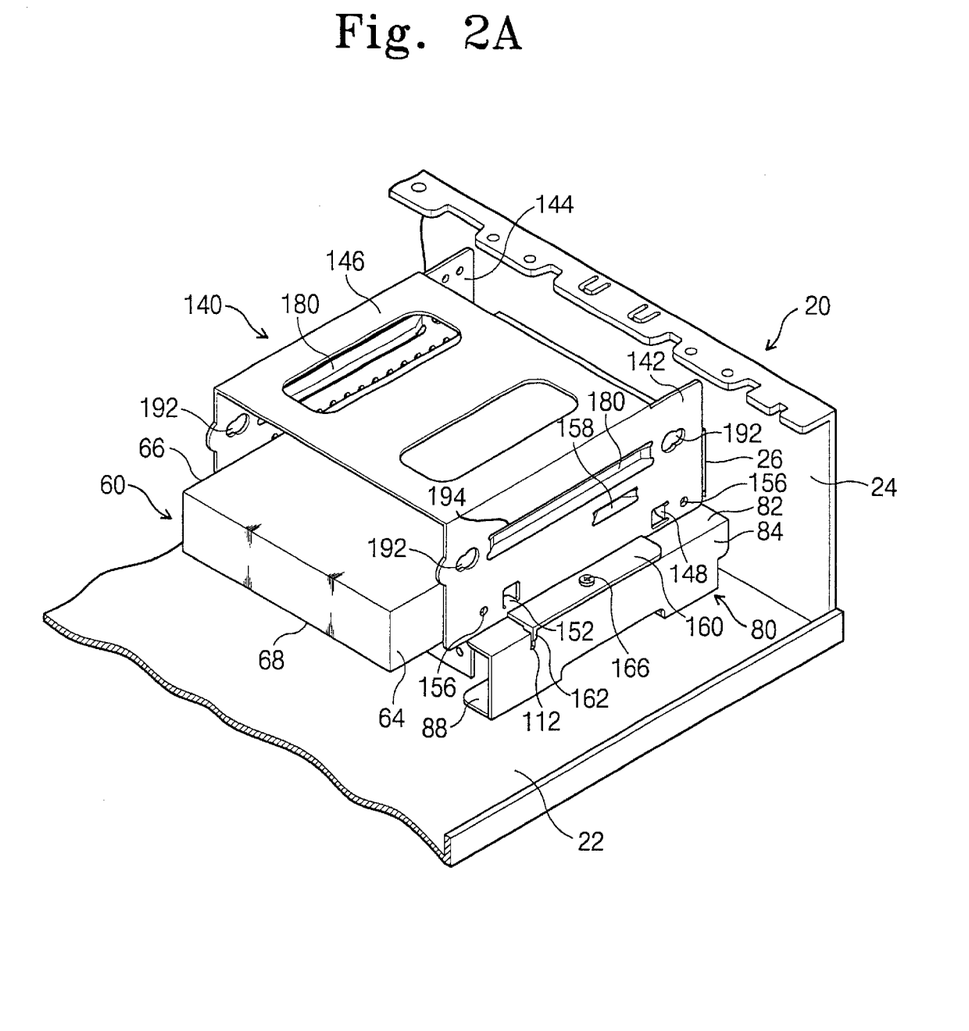
FIGS. 2A and 2B are perspective views showing a disk drive mounting structure according to a preferred embodiment of the present invention.
Figure 2B:
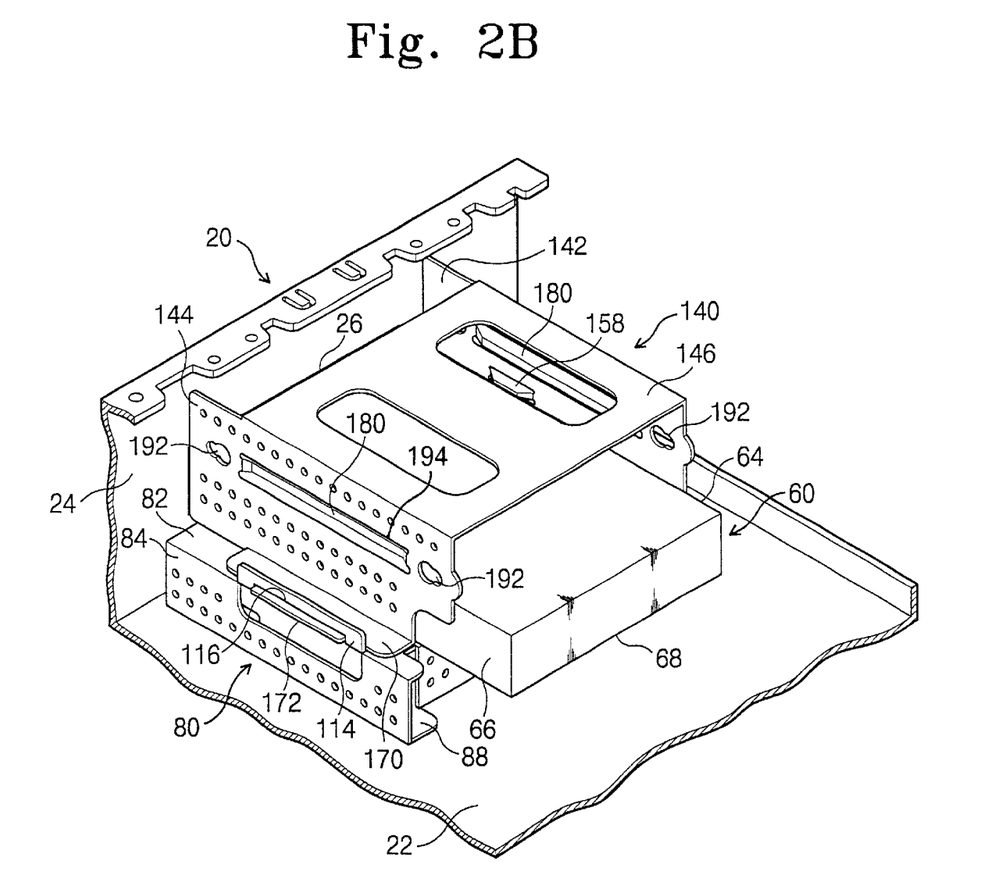

Turning now to drawings, FIG. 1 illustrates a personal computer 10 that may be a desktop computer, a laptop computer or a tower computer. The personal computer 10 includes a chassis 20 to which a motherboard 30 is mounted. A processor 32, a plurality of memory devices or modules 34 and input and output devices 36 are mounted onto the motherboard 30. Additionally, two buses 38a and 38b are mounted onto the motherboard 30 so that the bus 38a connects the process 32 with the memory devices or modules 34 and the bus 38b connects the process 32 with the input and output devices 36. A power supply 40 is connected to the motherboard 30, and a hard disk drive 50 and a floppy disk drive 60 are connected to the power supply 40 through two cables 40a and 40b, respectively. Of course, it is understood that the remaining elements, electric wires, electric circuits and related devices (not shown) are mounted to the chassis 20. Since these have common constructions, further explanation is omitted.

FIGS. 2A to 3B are views for describing a disk drive mounting structure for computers according to a preferred embodiment of the present invention. Referring to FIGS. 2A through 3B, the chassis 20 includes a bottom plate 22 and a front plate 24. Although illustration is omitted in the drawings for ease of explanation, the chassis 20 may include side plates, a rear plate, an external housing and a cover. The chassis 20 is preferably made of sheet metal, while the external housing is made of plastic. An opening 26 is formed on the front plate 24 of the chassis 20. As will be described below, the opening 26 receives the disk drive that is being combined with the mounting structure. Therefore, the disk drive is mounted even with the opening 26. Here, the disk drive is not restricted. That is, the disk drive may have a floppy disk drive for 3.5 inch floppy disks, etc., a CD-ROM drive for CD-ROMs and other kinds of auxiliary storage drives. A plurality of hooks 28 are formed on the bottom plate 28. The hooks 28 are used to fix a first bracket to the chassis 20.

The mounting structure includes the first bracket 80 and the second bracket 140. The top portion of the first bracket 80 forms a drive-supporting surface 82 on which the floppy disk drive 60 is positioned. The first bracket 80 is fixed to the chassis 20, while the second bracket 140 is fixed to the drive-supporting surface 82 of the first bracket 80. In order to maintain the floppy disk drive 60 on the drive-supporting surface 82 of the first bracket 80, the second bracket 140 has a top portion 146 and side portions 142 and 144. In accordance with these constructions, the side portions 142 and 144 are fixed to the first bracket 80, and so the top portion 146 of the second bracket 140 is spaced apart from the drive-supporting surface 82, by that defining a space in which the floppy disk drive 60 is positioned. In brief, the mounting structure allows the disk drive to be positioned on the drive-supporting surface 82 of the first bracket 80. Additionally, a right sidewall 66 of the floppy disk drive 60 is supported by the first bracket 80, while a left sidewall 64 of the floppy disk drive 60 is supported by the second bracket 140, thereby supporting the floppy disk drive 60 on the chassis 20.

The floppy disk drive 60 generally includes a housing that is combined with the chassis 20 and contains drive elements. The housing includes a front wall 62, the left sidewall 64, the right sidewall 66 and a bottom 68. Although not illustrated in the drawings, the front wall 62 receives a disk through its slot. Screw holes 70, 72 and 76 are formed on the left sidewall 64, the right sidewall 66 and the bottom 68, respectively. Each of the screw holes 70, 72 and 76 may have a general shape of a hole. As will be described hereinafter, the bottom 68 of the disk drive 60 is laid on the drive-supporting surface 82, the right sidewall 66 of the disk drive 60 is supported by the first bracket 80, and the left sidewall 64 of the disk drive 60 is supported by the second bracket 140.

Figure 8:
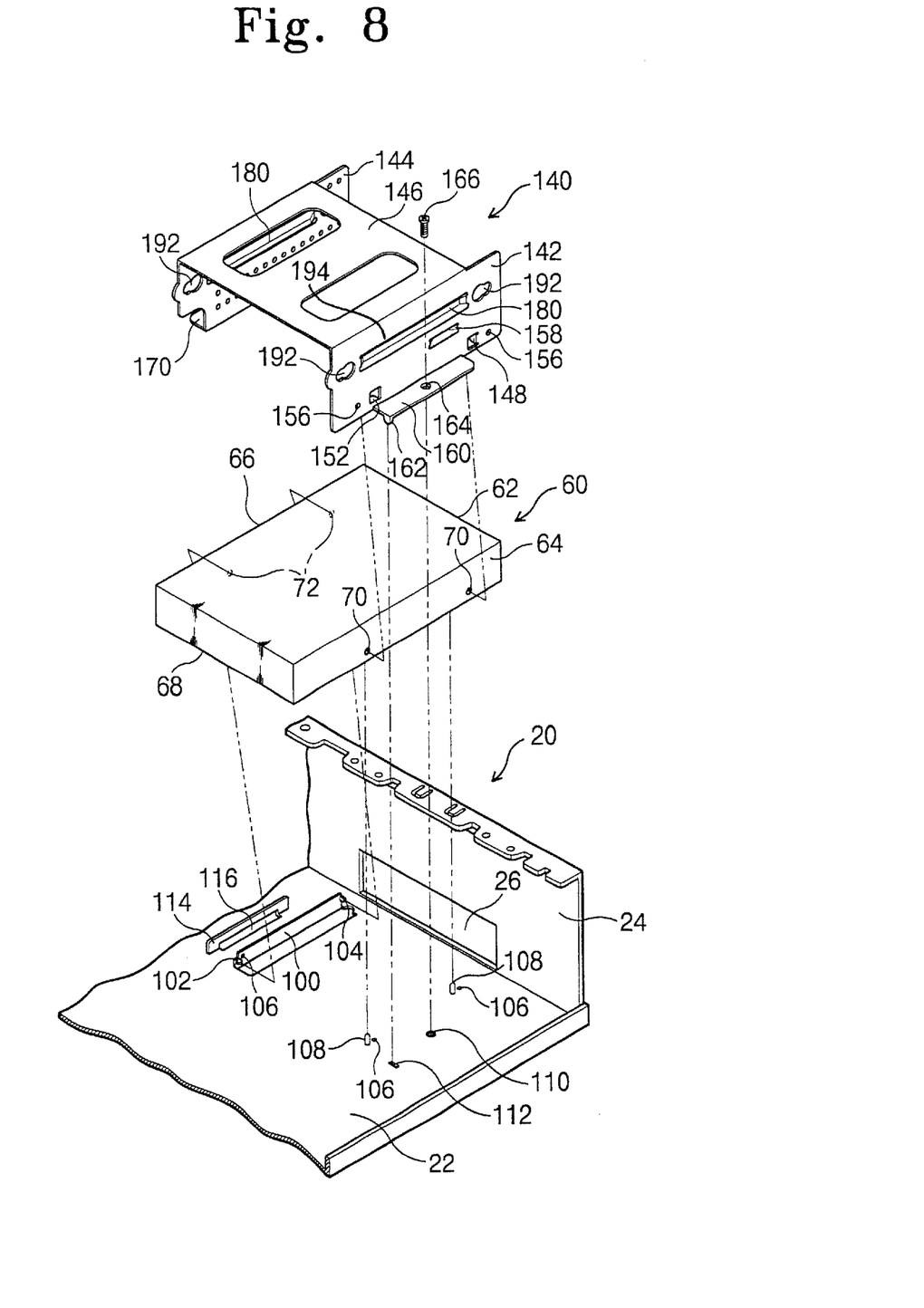
FIG. 8 is a perspective view showing a disk drive mounting structure, in which the bottom of a chassis is used instead of the first bracket, according to a preferred embodiment of the present invention.

The first bracket 80 is a structure that supports the disk drive 60 while allowing the disk drive 60 to be spaced apart from the bottom plate 22 of the chassis 20. However, as illustrated in FIG. 8, the first bracket 80 may be replaced by the bottom plate 22 of the chassis 20. At this time, the position of the opening 26 formed on the front plate 24 of the chassis 20 may be changed. Further, there are additionally needed constructions for holding the disk drive 60 and fixing the second bracket 140. Since these constructions are similar to the constructions formed on the first bracket 80, descriptions of these constructions are omitted.

Figure 3A:
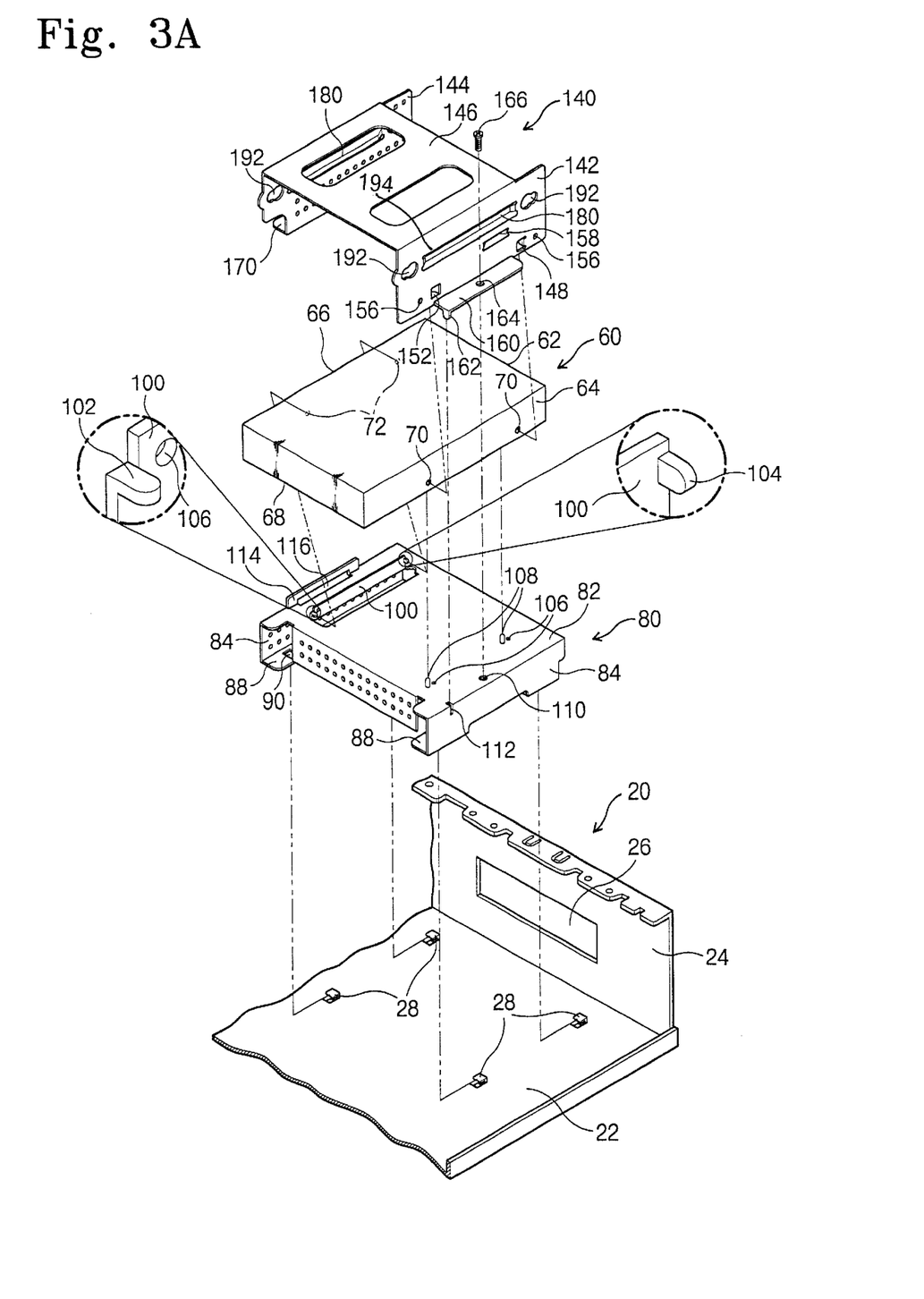
FIGS. 3A and 3B are exploded perspective views of FIGS. 2A and 2B, respectively.
Figure 3B:
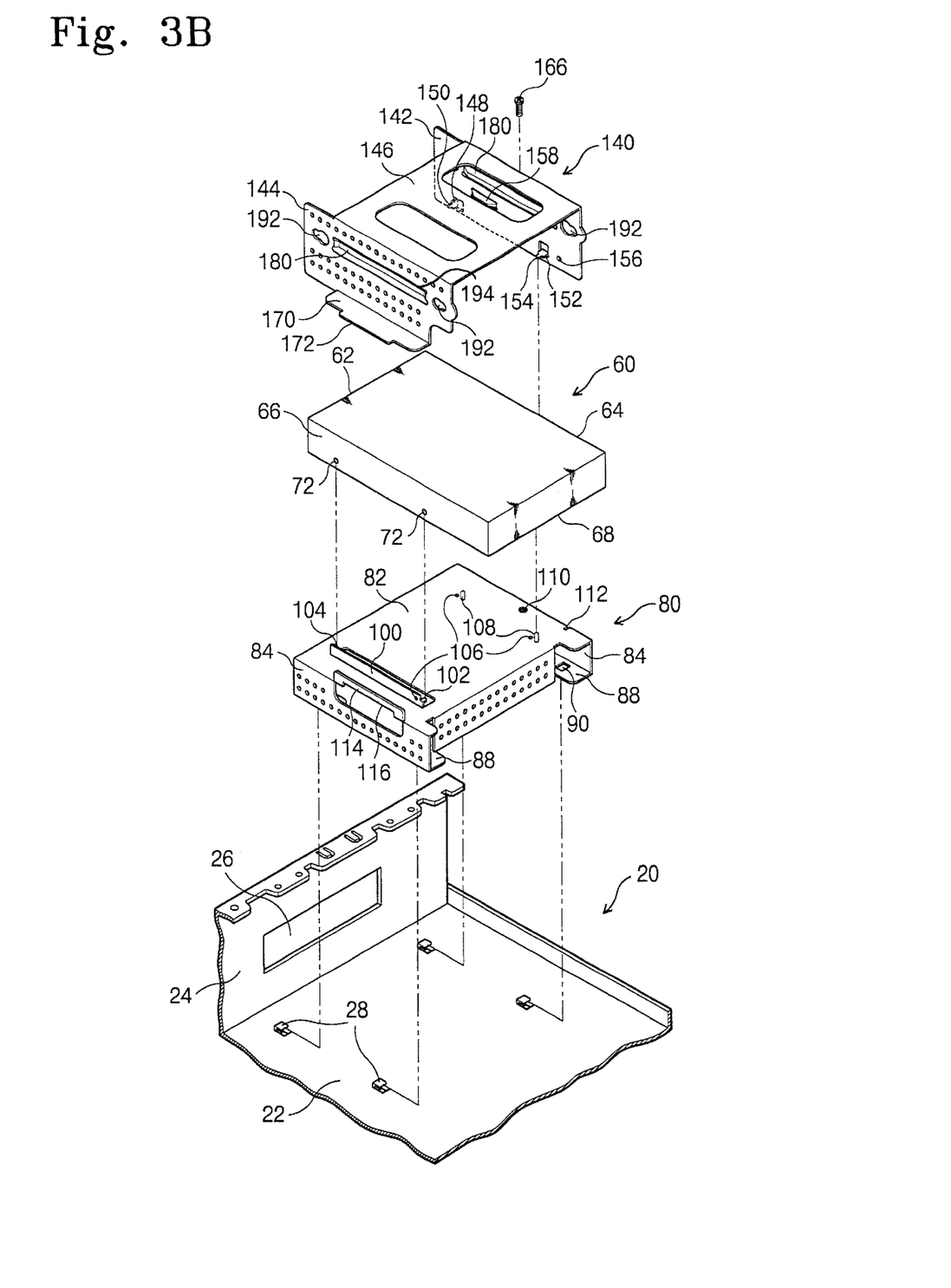

The first bracket 80 of this embodiment has constructions for combining the first bracket 80 with the chassis 20, holding the disk drive 60, and combining the second bracket 140 with the first bracket 80. The first bracket 80 has side portions 84, bottom portions 88 respectively extended inwardly from the lower ends of the side portions 84, and the drive-supporting surface 82 connecting the upper ends of the side portions 84. Fixing holes 90, which respectively correspond to hooks 28 formed on the bottom plate 22 of the chassis 20, are formed on the bottom portions 88. The bottom portions 88 and the fixing holes 90 combine the first bracket 80 with the bottom plate (or bottom portion) 22 of the chassis 20. A first vertical flange 100 is formed on a position near one side edge of the drive-supporting surface 82 and a second vertical flange 114 is formed along the one side edge of the drive-supporting surface 82. A horizontal fitting finger 102 and a vertical fitting finger 104 are respectively formed on the ends of the inner side surface of the first vertical flange 100. The fitting fingers 102 and 104 are formed so as to be fitted into the screw holes 72 formed on the right sidewall 66 of the drive housing. The widths of the fixing fingers 102 and 104 are designed to be substantially identical to the diameters of the screw holes 72. According to the constructions of the fitting fingers 102 and 104, the horizontal fitting finger 102 is engaged with the screw hole 72 of the disk drive 60 horizontally, while the vertical fitting finger 104 is engaged with the screw hole 72 of the disk drive 60 vertically. That is, the horizontal fitting finger 102 restrains the front and rear movement of the disk drive 60, while the vertical fitting finger 104 restrains the upward and downward movement of the disk drive 60. As will be described hereinafter, the second vertical flange 114 is used to hold one side of the second bracket 140. A slot 116 is formed on the second vertical flange 114. A locking projection 172 of the second bracket 140 is inserted into the slot 116.

Pins 108 are formed on a position near the other side edge of the drive-supporting surface 82. The pins 108 are inserted into the screw holes 76 (refer to FIG. 5A) formed on the bottom 68 of the drive housing. The pins 108 serve to hold the disk drive 60 securely. Auxiliary holes 106 may be respectively formed ahead of the pins 108 and the horizontal finger 102. The auxiliary holes 106 are used to move the disk drive 60 toward the front plate 24 of the chassis 20. For example, the pins that are inserted into the screw holes 72 and 76 of the disk drive 60 may be inserted into the auxiliary holes 106. In such a case, the fitting fingers 102 and 104 and the pins 108 are unnecessary. The first vertical flange 100, the fitting fingers 102 and 104, the pins 108 and the auxiliary holes 106 are constructions for fixing the disk drive 60. A screw hole 110 and a notch 112 are formed on the other side end portion of the drive-supporting surface 82. The screw hole 110 serves to fix the second bracket 140 by means of a screw 166, while the notch 112 serves to facilitate the combination of the second bracket 140 with the first bracket 80. The second vertical flange 114, the slot 116, the screw hole 110, and the notch 112 are constructions for combining the second bracket 140 with the first bracket 80.

Figure 7:
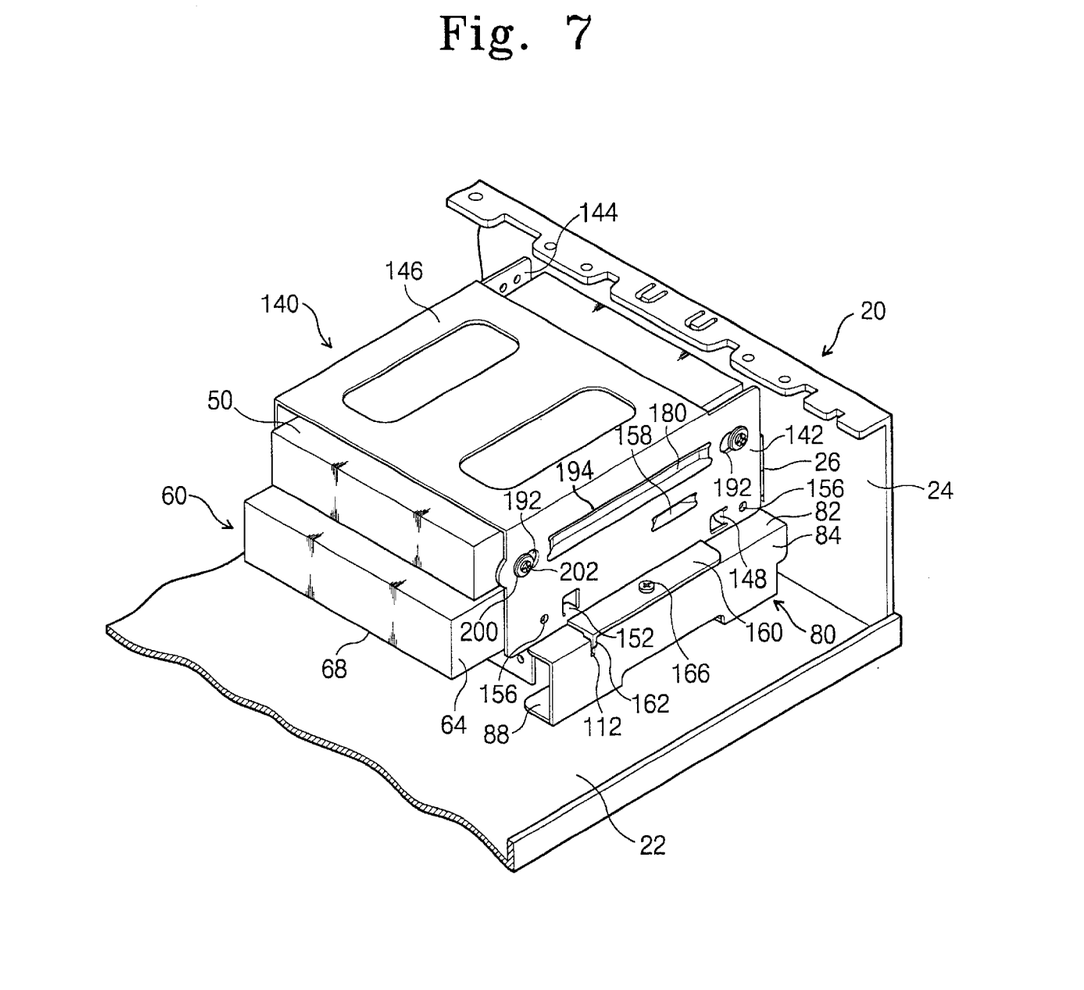
FIG. 7 is a perspective view showing a state in which a hard disk drive is combined with the second bracket.

The second bracket 140 includes a left side portion 142, a right side portion 144 and a top portion 146. The heights of the left and right side portions 142 and 144 are greater than the height of the disk drive 60, respectively. Additionally, as shown in FIG. 7, the heights of the side portions 142 and 144 may be designed to receive another disk drive. Of course, the mounting structure of this embodiment is designed to have constructions for combining the hard disk drive 50 with the second bracket 140. To this end, holes 192 are formed on the left and right side portions 142 and 144, and supporters 180 are inserted into the longitudinal holes 194. The supporters 180 serve to hold the disk drive 50 at both sides of the disk drive 50 although there is a difference between the width of the second bracket 140 and the width of the hard disk drive 50. In order to combine the hard disk drive 50 with the second bracket 140, a known technique may be employed. In the embodiment shown in FIG. 7, a rubber medium 200 is interposed between the second bracket 140 and a screw 202 that is used to fix the hard disk drive 50 to the second bracket 140. Since the combination of the hard disk drive 50 is performed using a known technique, explanation of the technique is omitted.

A vertical fitting finger 150 and a horizontal fitting finger 154 are formed on the left side portion 142 of the second bracket 140 so as to be engaged with the screw holes 70 formed on the left sidewall 64 of the disk housing. The vertical and horizontal fitting fingers 150 and 154 are inserted into and hold the floppy disk drive 60 in a direction opposite to the direction in which the vertical and horizontal fitting fingers 104 and 102 are inserted into and hold the floppy disk drive 60. Since the constructions of the vertical and horizontal fitting fingers 150 and 154 are respectively identical to the constructions of the vertical and horizontal fitting fingers 104 and 102, description of the vertical and horizontal fitting fingers 150 and 154 is omitted. The vertical and horizontal fitting fingers 150 and 154 of the second bracket 140 are extended inwardly from a vertical tab 148 and a horizontal tab 152, respectively. The vertical and horizontal tabs 148 and 152 allow the floppy disk drive 60 to be spaced apart from the second bracket 140 while holding the left sidewall 64 of the drive housing, after the vertical and horizontal fingers 150 and 154 are inserted into the screw holes 70. A supporter 158 is formed on the left side portion 142 of the second bracket 140 so as to hold the floppy disk drive 60. The height of the supporter 158 is identical to the height of the vertical and horizontal tabs 148 and 152. Auxiliary holes 156 are formed ahead of the vertical tab 148 and behind the horizontal tab 152.

A first horizontal flange 160 is extended outwardly from the lower end of the left side portion 142 of the second bracket 140, and a second horizontal flange 170 is extended outwardly from the lower end of the right side portion 144 of the second bracket 140. The first and second horizontal flanges 160 and 170 are used to combine the second bracket 140 with the first bracket 80. As shown in FIG. 3A, a fitting projection 162 and a hole 164 are formed on the first horizontal flange 160, the projecting 162 being inserted into the notch 112 of the first bracket 80, the hole 164 corresponding to the hole 110 of the first bracket 80. The fitting projection 162 is used to designate a combined position when the second bracket 140 is combined with the first bracket 80. The screw 166 is inserted into the screw hole 110 of the first bracket 80 through the hole 164 of the second bracket 140, thereby fixing the second bracket 140 to the first bracket 80. As shown in FIG. 3B, the locking projection 172 is formed on the second horizontal flange 170 so as to be inserted into the slot 116 of the second vertical flange 114 of the first bracket 80.

FIGS. 4A to 6D are views showing how to mount the disk drive to the chassis in the preferred embodiment of the present invention.

Figure 4A:
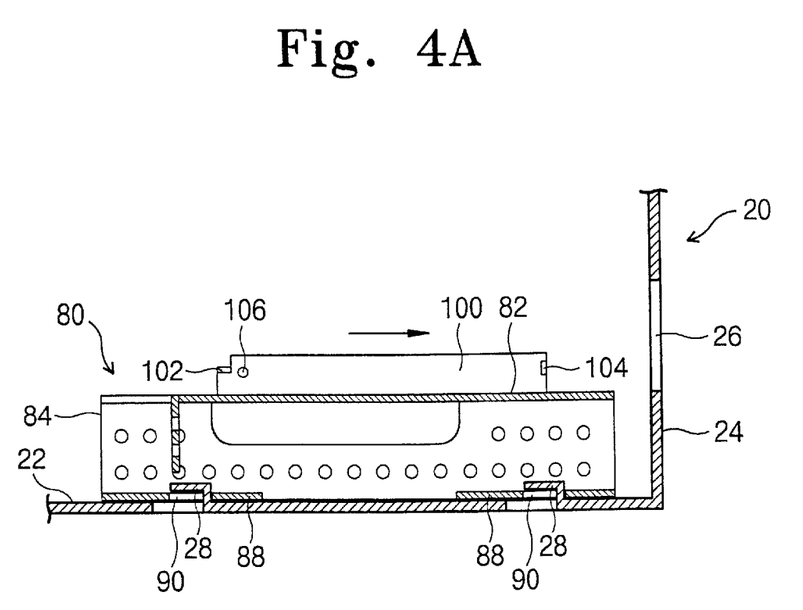
FIGS. 4A and 4B are partial cross sections of FIG. 2A showing an operation in which a first bracket is combined with a chassis.
Figure 4B:
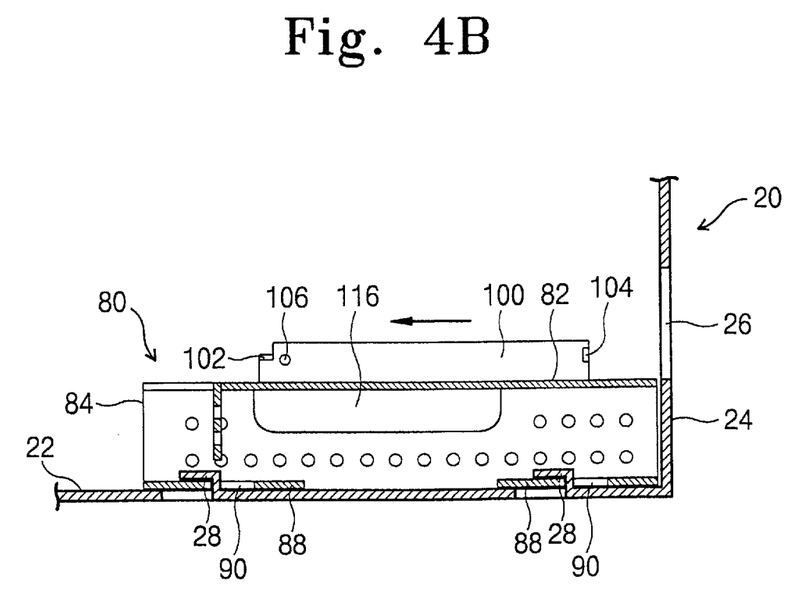

As shown in FIG. 4A, the first bracket 80 is positioned on the bottom plate 22 of the chassis 20 so that the hooks 28 are inserted into the holes 90 formed on the bottom 88 of the first bracket 80. At this time, when the first bracket 80 is pushed to a direction designated by the arrow of FIG. 4A (that is, a direction toward the front plate 24 of the chassis 20), the hooks 28 are engaged with the bottom 88 of the first bracket 80. On the other hand, when the first bracket 80 is pushed to a direction designated by the arrow of FIG. 4B (that is, a direction toward the rear plate of the chassis 20), the first bracket 80 may be separated from the chassis 20. As described above, the first bracket 80 is separably combined with the bottom plate 22 of the chassis 20. On the other hand, as shown in FIG. 8, in a case where the floppy disk drive is combined with the bottom plate 22 of the chassis 20, the above process is not necessary.

Figure 5A:
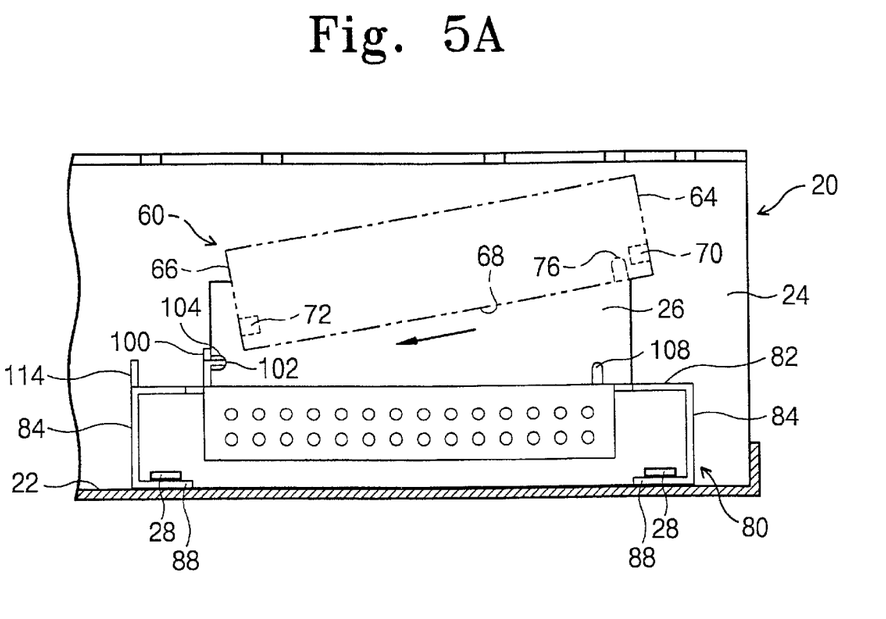
FIGS. 5A through 5C are side views showing an operation in which a disk drive is combined with the first bracket.
Figure 5B:
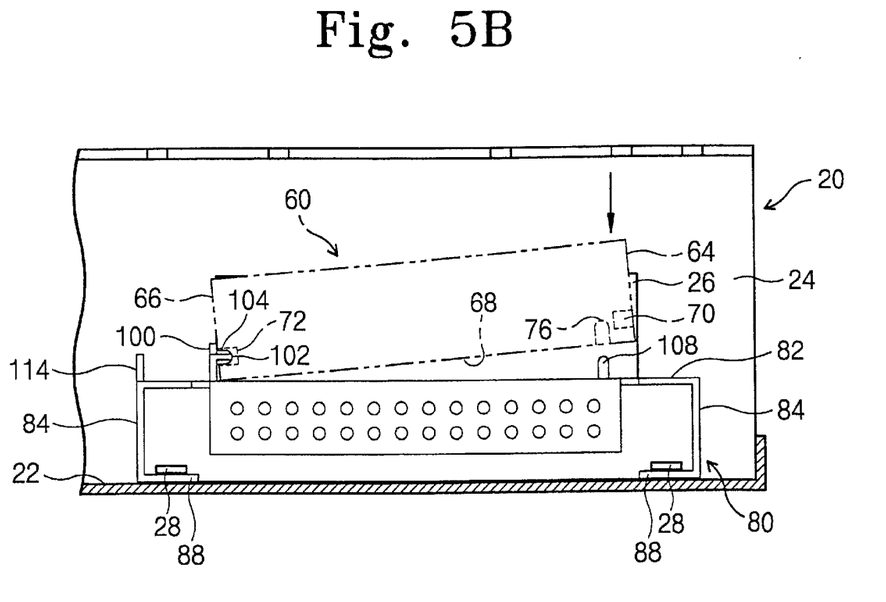
Figure 5C:
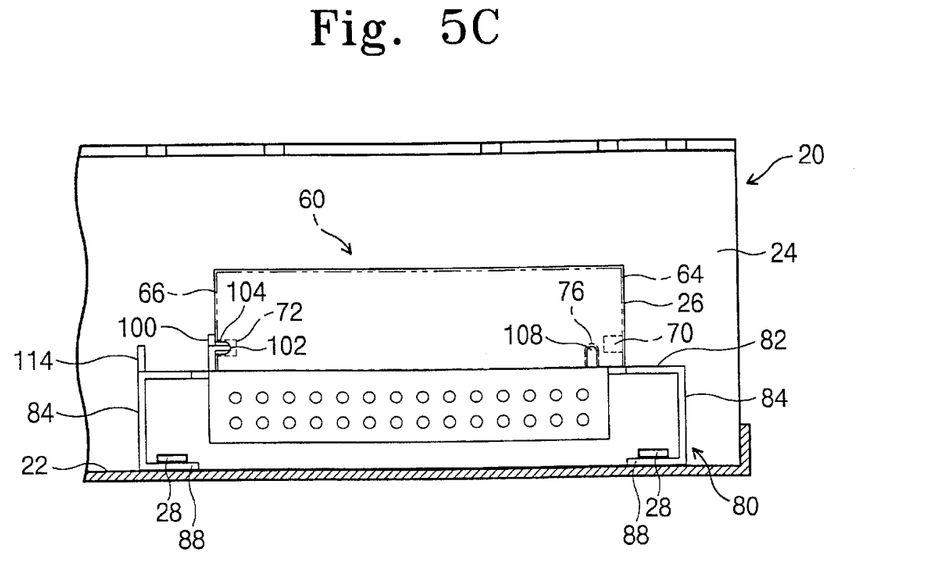

As shown in FIGS. 5A to 5C, the floppy disk drive 60 is combined with the drive-supporting surface 82 of the first bracket 80. Referring to FIG. 5A, the floppy disk drive 60 is moved to the first bracket 80 along the arrow of FIG. 5A so as to allow the horizontal and vertical fingers 102 and 104 of the first bracket 80 to be inserted into the screw holes 72 of the right portion 66 of the drive housing, thereby causing the disk drive 60 to be at a state shown in FIG. 5B. At this state, when the floppy disk drive 60 is positioned along the arrow of FIG. 5B, the floppy disk drive 60 is caused to be at a state shown in FIG. 5C. As described above, the floppy disk drive 60 is combined with the first bracket 80 at its right sidewall 66 by means of the horizontal and vertical fingers 102 and 104 of the first bracket 80, and is combined with the first bracket 80 at its bottom 68 by means of pins 108 of the first bracket 80. In such a case, the left sidewall 66 of the disk drive 60 comes into contact with the first vertical flange 100 on which the horizontal and vertical fingers 102 and 104 are formed. Additionally, the bottom 68 of the floppy disk drive 60 comes into contact with the drive-supporting surface 82.

While the floppy disk drive 60 is fixed to the first bracket 80, the second bracket 140 is fixed to the floppy disk drive 60 and the first bracket 80 as shown in FIGS. 6A to 6D.

Figure 6A:
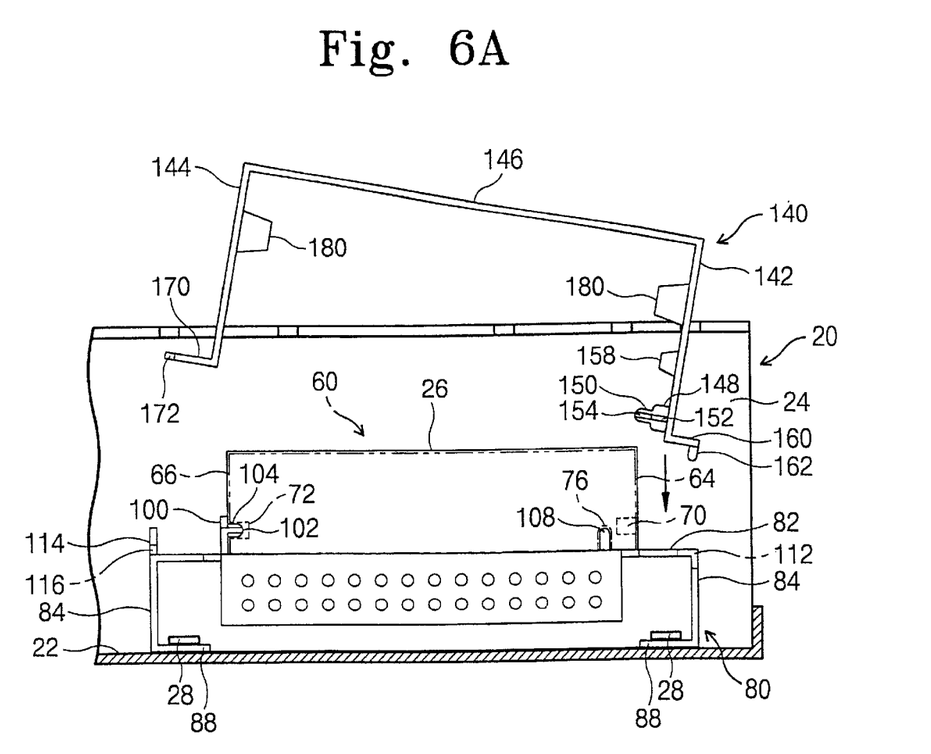
FIGS. 6A through 6D are side views showing an operation in which a first bracket is combined with the first bracket.
Figure 6B:
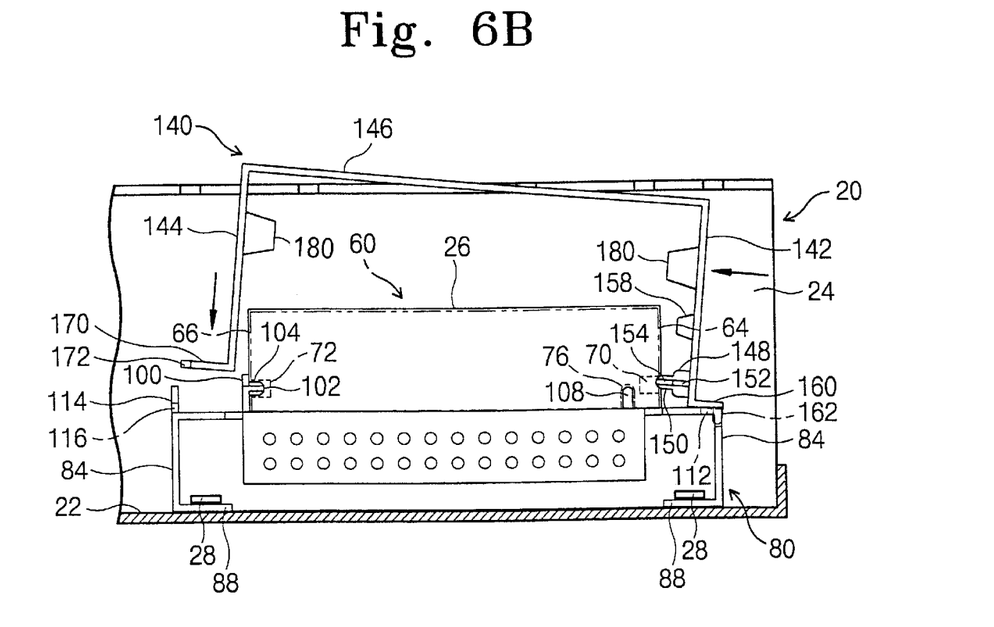
Figure 6C:
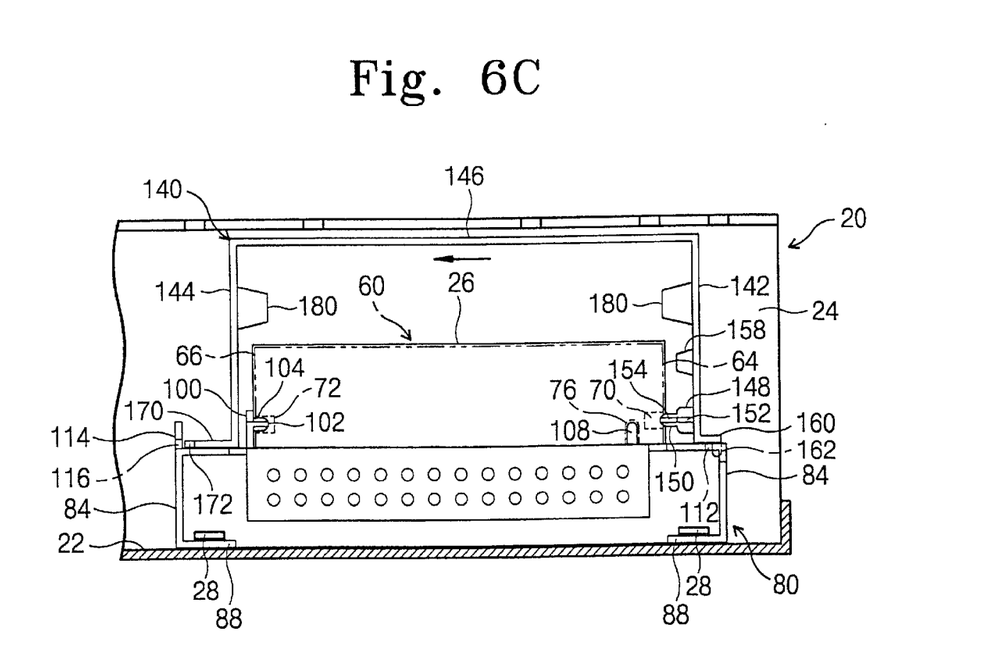
Figure 6D:
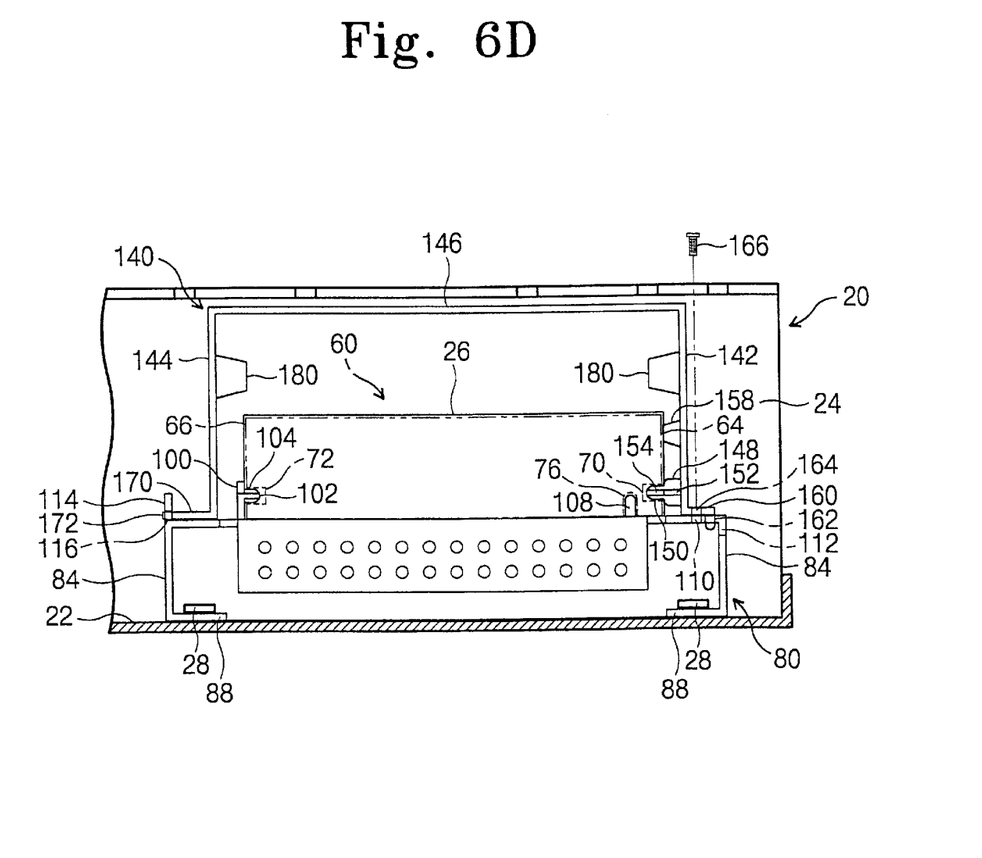

Referring to FIG. 6A, the second bracket 140 is moved to the first bracket 80 along the arrow of FIG. 6A so as to allow the horizontal and vertical fingers 154 and 150 of the second bracket 140 to be inserted into the screw holes 70 of the left portion 64 of the drive housing, thereby causing the disk drive 60 to be at a state shown in FIG. 5B. At this time, the fitting projection 162 formed on the first horizontal flange 160 is inserted into the notch 112 formed on the first bracket 80, so that the horizontal and vertical fingers 154 and 150 are positioned in the corresponding screw holes 70. At this state, when the second bracket 140 is laid on the drive-supporting surface 82 along the arrow of FIG. 6B, the second bracket 140 is caused to be at a state shown in FIG. 6C. That is, the second horizontal flange 170 is positioned between the first and second vertical flanges 100 and 114. Finally, when the second bracket 140 is pushed along the arrow of FIG. 6C, the second bracket 140 is combined with the first bracket 80, so that the floppy disk drive 60 is stably supported by means of the first and second brackets 80 and 140. At this state, the floppy disk drive 60 is combined with the second bracket 140 at its right sidewall 64 by means of the vertical and horizontal fingers 150 and 154. The second bracket 140 is combined with the first bracket 80 with the locking projection 172 of the second horizontal flange 170 inserted into the slot 116 of the second vertical flange 114. In addition, as shown in FIG. 6D, the second bracket 140 is fixed to the first bracket 80 by means of the screw 166 that is inserted into the screw hole 110 of the first bracket 80 through the hole 164 of the first flange 160. Incidentally, as described above and illustrated in FIG. 7, the hard disk drive 50 may be combined above the floppy disk drive 60 with the second bracket 140.

As described above, the present invention provides a disk drive mounting structure for computers, capable of easing the mounting and separation of the disk drive because there are no additional parts needed, such as screws for mounting the disk drive to a chassis at the side of the chassis and brackets and rails attached to the disk drive. Additionally, the present invention provides a disk drive mounting structure for computers, capable of easing the assembly of a bay because there are not needed additional parts and processes for attaching the brackets of the bay to the chassis. Furthermore, the present invention provides a disk drive mounting structure for computers, capable of easing the supply and control of the parts and reducing the manufacturing cost of the computer because the quantity of the parts is reduced. Incidentally, the present invention provides a disk drive mounting structure for computers, capable of reducing assembly gaps because the quantity of the parts for mounting the disk drive is reduced.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A disk drive mounting structure for computers, comprising:
   a chassis having a base surface;
   a first bracket having a surface supporting the disk drive and being detachably engageable with said base surface;
   a second bracket having two opposing side portions and a top portion connecting the side portions, said second bracket being combined with said first bracket at the side portions of said second bracket with the top portion being spaced apart from the surface of said first bracket;

a first locking member being formed on the surface of said first bracket and being engaged with a first sidewall of the disk drive; and a second locking member being formed on a side of said second bracket and being engaged with a second sidewall of the disk drive.

2. The structure of claim 1, with the disk drive being provided with a plurality of first holes on the first and second sidewalls of the disk drive, each one of said first and second locking members being inserted into a corresponding one of said first holes.

3. The structure of claim 1, with said first bracket forming a portion of said chassis.

4. The structure of claim 1, with said first bracket having a first flange and a second hole, the first flange being formed vertically on a side of a top surface of said first bracket and having a slot, the second hole being formed on an opposite side of the top surface said first bracket, said second bracket having a second flange and a third flange, the second flange being formed horizontally on a side of said second bracket corresponding to the first flange, the third flange being formed horizontally on an opposite side of said second bracket, said second bracket having a third hole corresponding to the second hole of said first bracket, the second flange of said second bracket being inserted into the slot of the first flange of said first bracket and said third flange of said second bracket being fastened to said first bracket by a screw passing through the second hole of said first bracket and the third hole of said second bracket.

5. The structure of claim 1, further comprising a second disk drive mounted within said second bracket.

6. The structure of claim 2, with said first locking member having a vertical portion and a plurality of first fingers, the first fingers being extended inwardly from the vertical portion and being inserted into the first holes of the disk drive with the sidewall of the disk drive being in contact with the vertical portion.

7. The structure of claim 2, with said second locking member having a tab formed on a side of said second bracket and a plurality of second fingers extended inwardly from the tab, the second fingers being inserted into the first holes of the disk drive with the tabs being in contact with a sidewall of the disk drive and the sidewall being spaced apart from a side of said second bracket.

8. The structure of claim 2, with the disk drive having a fourth hole on a bottom surface of the disk drive, said first bracket having a pin inserted into the fourth hole.

9. The structure of claim 6, with one of said first fingers being horizontal, another one of said first fingers being vertical, said horizontal first finger restraining a front and rear movement of the disk drive, said vertical first finger restraining an upward and downward movement of the disk drive.

10. The structure of claim 7, with one of said second fingers being horizontal, the other one of said second fingers being vertical.

11. The structure of claim 4, with said first bracket having a notch on a side of said first bracket having the second hole, said second bracket having an additional tab being inserted into the notch.

12. The structure of claim 9, with said first fingers having a width equal to a diameter of the first holes on the disk drive.

13. A method of mounting a disk drive to a computer chassis, comprising the steps of:

combining a first bracket having a drive-supporting surface with a computer chassis;

positioning a first disk drive on the drive-supporting surface with a first sidewall of the first disk drive being engaged with a first locking member formed on the drive-supporting surface; and engaging a second sidewall of the first disk drive with a second locking member formed on an opposite side of a second bracket to the first locking member and connecting said second bracket with said first bracket.

14. The method of claim 13, further comprising the step of inserting a second disk drive within said second bracket.

15. The method of claim 14, with said combining a first bracket comprising the step of inserting a hook formed on said computer chassis into a first hole formed on said first bracket.

16. The method of claim 15, with said positioning said first disk comprising the step of inserting said first locking members into corresponding second holes formed on said first disk drive, said first locking member having a vertical first flange with a vertical finger and a horizontal finger extended inwardly from the first flange, said horizontal finger restraining a front and rear movement of said first disk drive, said vertical finger restraining an upward and downward movement of said first disk drive.

17. The method of claim 16, with said engaging said second sidewall of said first disk drive comprising the step of inserting a plurality of second fingers into corresponding second holes in said first disk drive, one of said second fingers being horizontal, a second one of said second fingers being vertical, said horizontal second finger restraining a front and rear movement of said first disk drive, said vertical second finger restraining an upward and downward movement of said first disk drive, each one of said second fingers extending inwardly from a tab formed on a side of said second bracket, said tabs and second fingers forming said second locking member.

18. An apparatus, comprising:

a first disk drive, said disk drive reading a storage media, said disk drive having a plurality of first holes on a first sidewall and a second sidewall of said disk drive;

a chassis having a base surface;

a first bracket having a drive-supporting surface, said chassis engaged with said first bracket, said first bracket having a first flange and a second hole, the first flange being formed vertically on a side of a top surface of said first bracket and having a slot, the second hole being formed on an opposite side of the top surface said first bracket, said first bracket having a pin inserted into a third hole on a bottom surface of said disk drive;

a second bracket having two opposing side portions and a top portion connecting the side portions, said second bracket being combined with said first bracket at the side portions of said second bracket with the top portion being spaced apart from the drive-supporting surface, said second bracket having a second flange and a third flange, the second flange being formed horizontally on a side of said second bracket corresponding to the first flange, the third flange being formed horizontally on an opposite side of said second bracket, said second bracket having a fourth hole corresponding to the second hole of said first bracket, the second flange of said second bracket being inserted into the slot of the first flange of said first bracket and the third flange of said second bracket being fastened to said first bracket by a screw passing through the second hole of said first bracket and the fourth hole of said second bracket, said second bracket having a fourth flange being horizontal and flat with the drive-supporting surface of said first bracket, the fourth flange having a projection being inserted into a notch formed into the drive-supporting surface of said first bracket;

a first locking member being formed on the drive-supporting surface and being engaged with the first sidewall of said disk drive, said first locking member having a vertical portion and a plurality of first fingers, the first fingers being extended inwardly from the vertical portion and being inserted into the first holes of said disk drive with the sidewall of said disk drive being in contact with the vertical portion, one of the first fingers being horizontal, another one of the first fingers being vertical, the horizontal first finger restraining a front and rear movement of said disk drive, the vertical first finger restraining an upward and downward movement of said disk drive; and a second locking member being formed on a side of said second bracket and being engaged with the second sidewall of said disk drive, said second locking member having a plurality of tabs formed on a side of said second bracket and a plurality of second fingers extended inwardly from each one of the tabs, the second fingers being inserted into the first holes of said disk drive with the tabs being in contact with a sidewall of said disk drive and the sidewall being spaced apart from a side of said second bracket, one of the second fingers being horizontal, another one of the second fingers being vertical, the horizontal second finger restraining a front and rear movement of said disk drive, the vertical second finger restraining an upward and downward movement of said disk drive.

19. The apparatus of claim 18, with said first bracket forming a portion of said chassis.

20. The apparatus of claim 19, further comprising a second disk drive inserted into said second bracket, a longitudinal support holding said second disk above said first disk drive.

* * * * *